United States Patent
Rakshit et al.

(10) Patent No.: US 11,108,949 B2
(45) Date of Patent: *Aug. 31, 2021

(54) MANAGING CAMERA USAGE WITH WARNINGS AND/OR DISABLEMENT

(71) Applicant: INTERNATIONAL BUSINESS MACHINES CORPORATION, Armonk, NY (US)

(72) Inventors: Sarbajit K. Rakshit, Kolkata (IN); Shilpa S. Shetty, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/690,693

(22) Filed: Nov. 21, 2019

(65) Prior Publication Data

US 2020/0092466 A1 Mar. 19, 2020

Related U.S. Application Data

(63) Continuation of application No. 15/441,429, filed on Feb. 24, 2017, now Pat. No. 10,567,642.

(51) Int. Cl.
*H04N 5/232* (2006.01)
*H04N 1/00* (2006.01)
(Continued)

(52) U.S. Cl.
CPC ....... *H04N 5/23222* (2013.01); *G06K 9/0063* (2013.01); *G06K 9/00671* (2013.01);
(Continued)

(58) Field of Classification Search
None
See application file for complete search history.

(56) References Cited

U.S. PATENT DOCUMENTS 8,805,281 B2  8/2014  Hsu
9,380,225 B2  6/2016  Tiscareno
(Continued)

OTHER PUBLICATIONS

Greene, Kate; Lights, Camera—Jamming; MIT Technology Review; Jun. 22, 2006; https://www.technologyreview.com/s/405968/lights-camera jamming/; 8 pages.
(Continued)

*Primary Examiner* — Quan Pham
(74) *Attorney, Agent, or Firm* — Schmeiser, Olsen & Watts; Nicholas L. Cadmus (57) ABSTRACT

An approach is provided for managing a usage of a camera. Based on a second location of the camera being determined to match a first location associated incidents of camera usage that caused harm, the camera is determined to be at a location of concern. The user is notified about the location of concern by a rule-specified, highlighted boundary in a pre-captured first image on the camera display. A person in a pre-captured second image is determined to be within the boundary. The usage of the camera by the user is determined to likely cause a danger to the person. Based on the person being within the boundary and the usage of the camera being likely to cause the danger, a functionality of the camera is disabled so that the camera is not able to capture an image.

10 Claims, 6 Drawing Sheets

(51) Int. Cl.
  *G06K 9/00* (2006.01)
  *G08B 21/04* (2006.01)
  *G08B 21/02* (2006.01)

(52) U.S. Cl.
  CPC ......... *G08B 21/02* (2013.01); *G08B 21/0476* (2013.01); *H04N 1/00244* (2013.01); *H04N 5/23206* (2013.01); *H04N 2201/0074* (2013.01); *H04N 2201/0084* (2013.01); *H04N 2201/3253* (2013.01)

(56) References Cited

U.S. PATENT DOCUMENTS

| | | | |
|---|---|---|---|
| 9,846,999 | B1 | 12/2017 | Pickover |
| 2012/0032806 | A1 | 2/2012 | Lee |
| 2013/0188031 | A1* | 7/2013 | Park ............. G06K 9/00369 348/77 |
| 2014/0022369 | A1 | 1/2014 | Kwon |
| 2014/0043213 | A1 | 2/2014 | Park |
| 2015/0009248 | A1 | 1/2015 | Bracalente |
| 2016/0061625 | A1 | 3/2016 | Wang |
| 2016/0182816 | A1 | 6/2016 | Luk |
| 2016/0203639 | A1 | 7/2016 | Bostick |
| 2017/0208169 | A1 | 7/2017 | Day, II |
| 2017/0279957 | A1 | 9/2017 | Abramson et al. |
| 2017/0323161 | A1 | 11/2017 | Du |
| 2017/0344854 | A1 | 11/2017 | Behringer |
| 2018/0184255 | A1 | 6/2018 | Marson |
| 2018/0249069 | A1 | 8/2018 | Rakshit |

OTHER PUBLICATIONS

Humphries, Matthew; Safe Haven: privacy from camera phones; Geek.com; Sep. 12, 2003; http://www.geek.com/mobile/safe-haven-privacy-from-camera-phones-554253/; 5 pages.

Kotadia, Munir; Jamming device aims at camera phones; CNET; Sep. 11, 2003; https://www.cnet.com/news//jamming-device-aims-at-camera-phones/; 7 pages.

Syta, James M.; List of IBM Patents or Patent Applications Treated as Related; Nov. 21, 2019; 1 page.

* cited by examiner

MANAGING CAMERA USAGE WITH WARNINGS AND/OR DISABLEMENT

CROSS REFERENCE TO RELATED APPLICATIONS

This application is a continuation application claiming priority to Ser. No. 15/441,429 filed Feb. 24, 2017, now U.S. Pat. No. 10,567,642 issued Feb. 18, 2020, the contents of which are hereby incorporated by reference.

BACKGROUND

The present invention relates to controlling the usage of a camera, and more particularly to sending warnings and/or disabling camera functionality to prevent camera usage in dangerous locations.

Many people are seriously injured or almost seriously injured because they try to take photographs (e.g., selfies) in dangerous locations or under dangerous conditions. Locations that pose risks to camera users often do not have posted warnings about the dangers. Because of the lack of posted warnings, camera users often receive no early warning about the dangers prior to the camera users attempting to take photographs in the locations.

SUMMARY

In one embodiment, the present invention provides a method of managing a usage of a camera. The method includes a computer determining a context of a camera being used by a user. The context includes information selected from the group consisting of a geographic location of the camera, a direction in which the camera is pointed, a position of the user, a time at which the camera is being used by the user, and an identification of object(s) in an image being processed by the camera. The method further includes based on the context of the camera, the computer determining that the usage of the camera by the user is likely to cause a danger to the user or to another person. The method further includes based on the usage of the camera being likely to cause the danger, the computer disabling a functionality of the camera or sending a notification about the danger to one or more persons.

In another embodiment, the present invention provides a computer program product including a computer-readable storage medium and a computer-readable program code stored in the computer-readable storage medium. The computer-readable program code includes instructions that are executed by a central processing unit (CPU) of a computer system to implement a method of managing a usage of a camera. The method includes the computer system determining a context of a camera being used by a user. The context includes information selected from the group consisting of a geographic location of the camera, a direction in which the camera is pointed, a position of the user, a time at which the camera is being used by the user, and an identification of object(s) in an image being processed by the camera. The method further includes based on the context of the camera, the computer system determining that the usage of the camera by the user is likely to cause a danger to the user or to another person. The method further includes based on the usage of the camera being likely to cause the danger, the computer system disabling a functionality of the camera or sending a notification about the danger to one or more persons.

In another embodiment, the present invention provides a computer system including a central processing unit (CPU); a memory coupled to the CPU; and a computer-readable storage device coupled to the CPU. The storage device includes instructions that are executed by the CPU via the memory to implement a method of managing a usage of a camera. The method includes the computer system determining a context of a camera being used by a user. The context includes information selected from the group consisting of a geographic location of the camera, a direction in which the camera is pointed, a position of the user, a time at which the camera is being used by the user, and an identification of object(s) in an image being processed by the camera. The method further includes based on the context of the camera, the computer system determining that the usage of the camera by the user is likely to cause a danger to the user or to another person. The method further includes based on the usage of the camera being likely to cause the danger, the computer system disabling a functionality of the camera or sending a notification about the danger to one or more persons.

Embodiments of the present invention provide an early warning system that determines that a danger that is likely to be experienced by a camera user and/or other(s) in response to the user capturing an image with the camera, and subsequently presents a warning to the camera user or to one or more other people (e.g., a parent of the camera user) and/or disables the functionality of the camera so that the image cannot be captured. The warning and/or disablement promotes the safety of the camera user and/or the other(s) by making it less likely that the user and/or the other(s) will be in a geographic location or in a bodily position associated with capturing the image, thereby decreasing the likelihood that the user and/or the other(s) will experience the aforementioned danger.

DETAILED DESCRIPTION

Overview

Embodiments of the present invention employ software installed in a camera or mobile phone device that includes a camera feature, where the software performs context analysis to predict if a user of the device or camera is planning to capture a selfie/groupie image or another image of surroundings that may cause an accident or otherwise result in harm to the user and/or to another person. In response to predicting that the user is planning to capture an image that may cause the accident or otherwise result in harm, the device or camera may proactively send a notification (i.e., a warning) to the user, one or more other people who are participating in the image being captured, and/or to one or more additional people who are supervising the user (e.g., the user's parents). Embodiments of the present invention may disable the functionality of the camera in response to the prediction that the user is planning to capture an image that may result in harm to the user and/or to another person. In one embodiment, a parent or guardian of the user, or another person who is supervising the user defines photo capturing rule(s) as part of parental control, where the rule(s) are the basis for determining whether a usage of the camera is likely to place the user in a dangerous situation, and if the usage of the camera likely places the user in a dangerous situation, the rule(s) are the basis for determining whether to send a notification to the parent, guardian, or other person who is supervising the user, notify the user about the dangerous situation, and/or disable the functionality of the camera. The photo capturing rule(s) may specify locations of concern and/or patterns of concern which are selected by the parent, guardian, or other person who is supervising the user.

System for Managing Camera Usage

Figure 1:
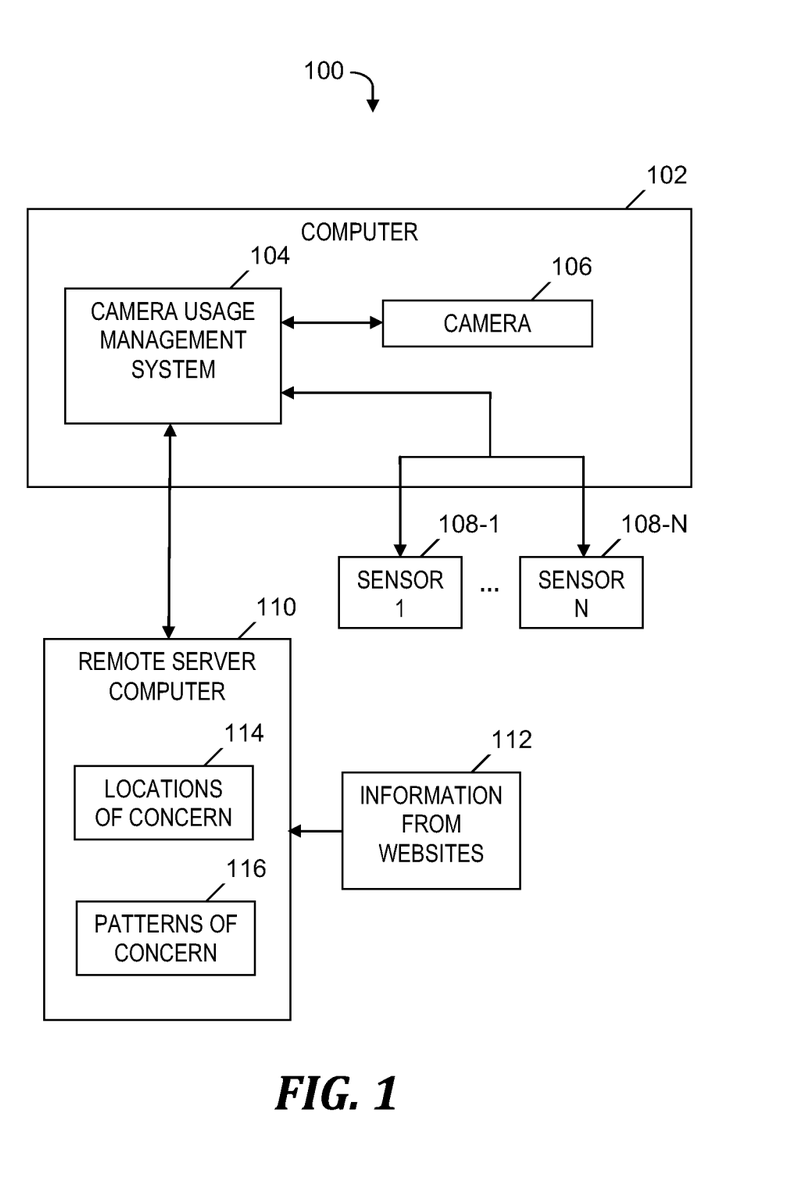
FIG. 1 is a block diagram of a system for managing a usage of a camera, in accordance with embodiments of the present invention.

FIG. 1 is a block diagram of a system 100 for managing a usage of a camera, in accordance with embodiments of the present invention. System 100 includes a computer 102, which executes a software-based camera usage management system 104 and which includes a camera 106. Camera usage management system 104 accesses information obtained by sensor 108-1, . . . , sensor 108-N, where N is an integer greater than or equal to one. In one embodiment, sensors 108-1, . . . , 108-N include a global positioning system (GPS) receiver that determines a geographic location of camera 106. In one embodiment sensors 108-1, . . . , 108-N include a sensor that detects a direction in which a lens of camera 106 is pointed.

Computer 102 is in communication with a remote server computer 110 via a computer network (not shown). Remote server computer 110 requests and receives information 112 from websites including, but not limited to, news websites and social networking websites. Information 112 includes descriptions of prior incidents of camera usage that caused harm to camera users, participants who were subjects in image captures, or to other people. Based on information 112 from the websites, remote server computer generates a master list of locations of concern 114 and patterns of concern 116, which specify, respectively, (1) geographic locations and (2) events, times of the events, and geographic locations at which the events occur, where the locations and patterns of concern are associated with the prior incidents that caused harm to the aforementioned camera users, participants, or to other people. In one embodiment, remote server computer 110 receives and stores camera user profile information (not shown) that includes information about levels of expertise of camera users in one or more activities and/or physical limitations of the camera users. A level of expertise of a camera user may indicate whether a geographic location is considered a location of concern or whether an event is associated with a pattern of concern. A physical limitation of a camera user may indicate whether a bodily position of a camera user indicates a pattern of concern. In one embodiment, remote server computer 110 receives and stores specifications from persons (e.g., parents) supervising respective camera users, where the specifications indicate whether a geographic location is considered a location of concern or whether an event associated with a time and a geographic location is considered a pattern of concern.

Figure 2A:
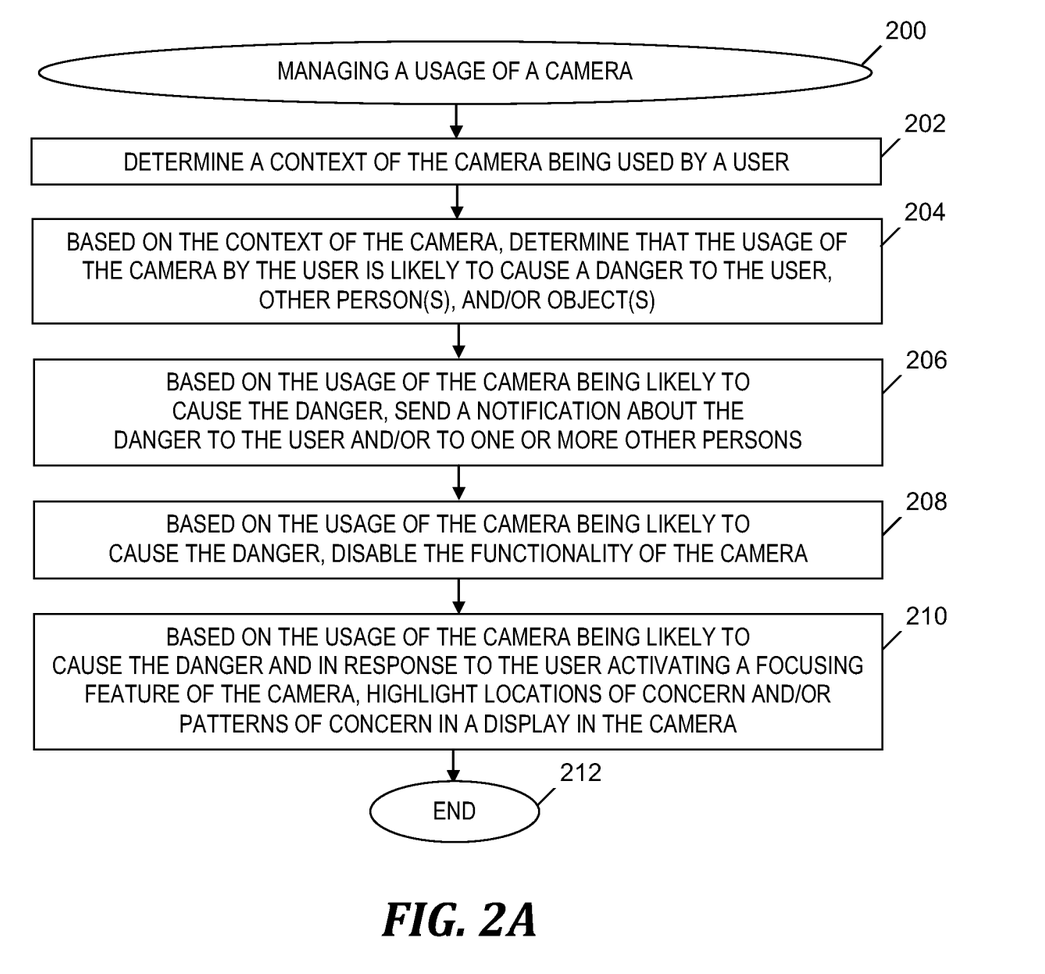
FIG. 2A is a flowchart of a process of managing a usage of a camera, in accordance with embodiments of the present invention.
Figure 2B:
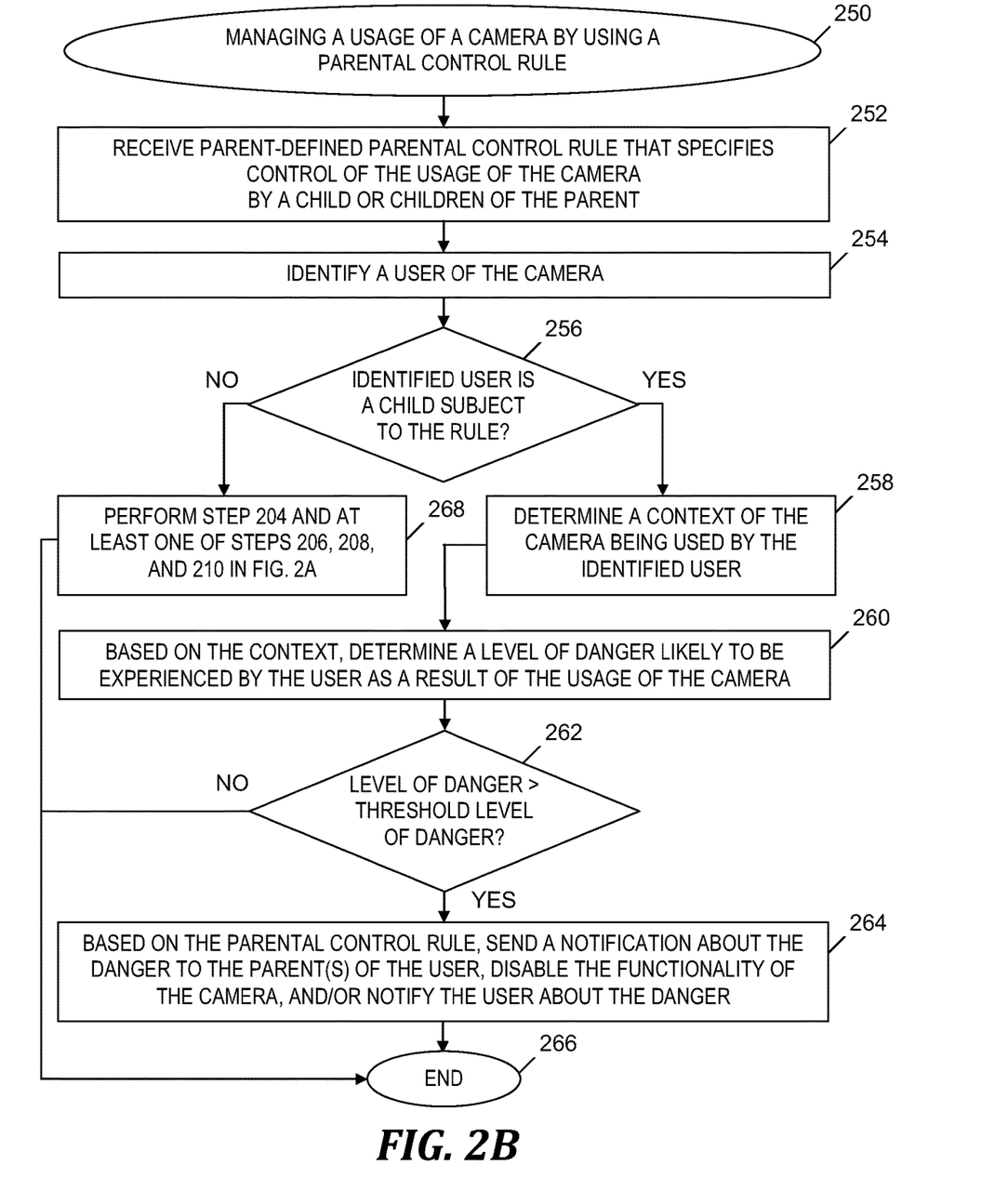
FIG. 2B is a flowchart of a process of managing a usage of a camera by using parental controls, in accordance with embodiments of the present invention.
Figure 3A:
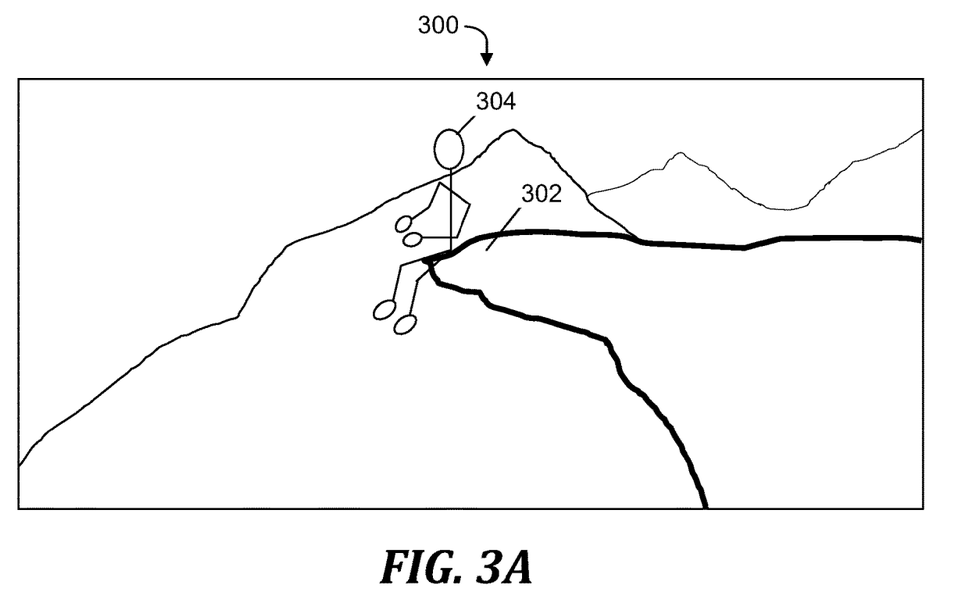
FIG. 3A depicts an example of a location and a position of a person at the location, which are identified by the system of FIG. 1 for managing the usage of a camera in the processes of FIG. 2A and FIG. 2B, in accordance with embodiments of the present invention.
Figure 3B:
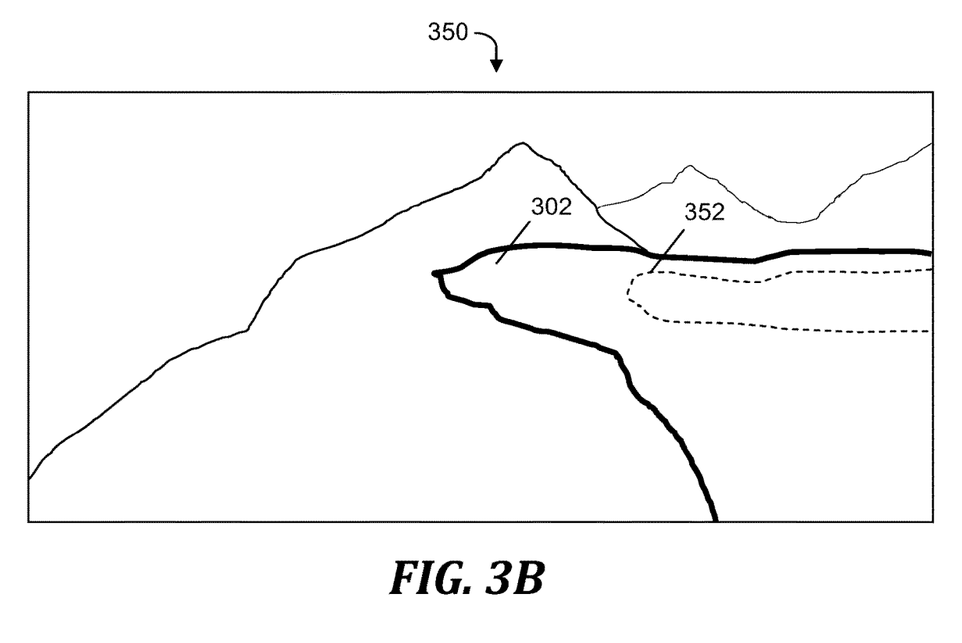
FIG. 3B depicts an example of a location of concern identified by the system of FIG. 1 for managing the usage of a camera in the processes of FIG. 2A and FIG. 2B, in accordance with embodiments of the present invention.
Figure 3C:
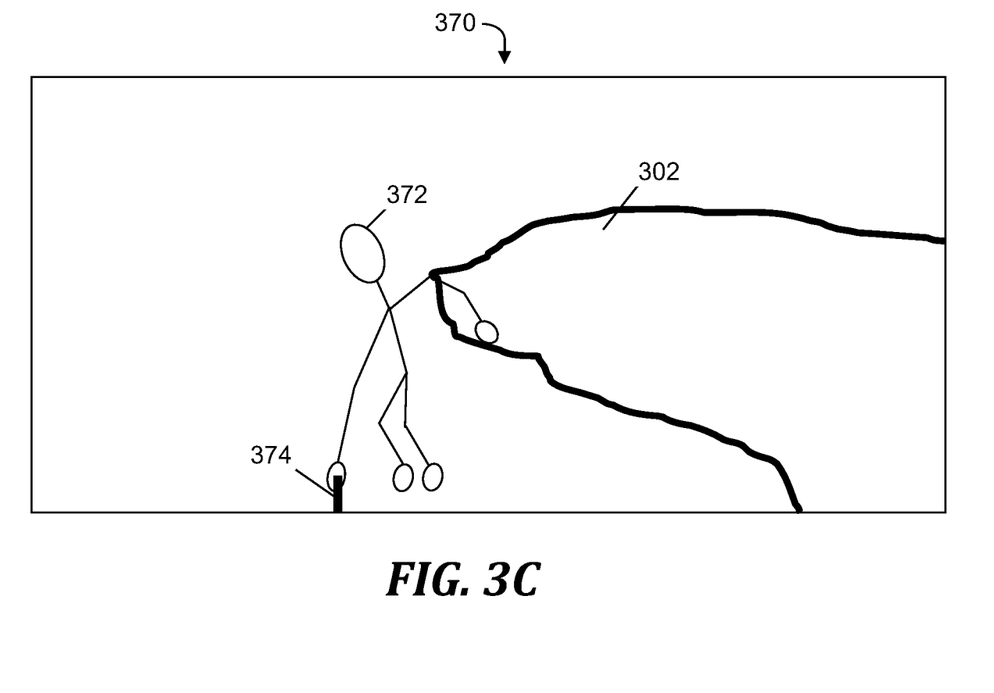
FIG. 3C depicts an example of a location of concern and a camera user at the location of concern identified by the system of FIG. 1 for managing the usage of a camera by the camera user in the processes of FIG. 2A and FIG. 2B, in accordance with embodiments of the present invention.

The functionality of the components shown in FIG. 1 is described in more detail in the discussion of FIG. 2 and FIG. 3 presented below.

Process for Managing Camera Usage

FIG. 2A is a flowchart of a process of managing a usage of a camera, in accordance with embodiments of the present invention. The process of FIG. 2A begins at step 200. In step 202, camera usage management system 104 (see FIG. 1) determines a context of camera 106 (see FIG. 1), which is being used by a user. The context includes, but is not limited to, (i) a geographic location of camera 106 (see FIG. 1), (ii) a time at which camera 106 (see FIG. 1) is being used, (iii) object(s), person(s), animal(s), and/or place(s) included in the surroundings of camera 106 (see FIG. 1), (iv) conditions and characteristics of the user of camera 106 (see FIG. 1) and/or conditions and characteristics of object(s), person(s), animal(s), and/or place(s) included in the surroundings of camera 106 (see FIG. 1), (v) a body posture of the user of camera 106 (see FIG. 1), (vi) a position of the user relative to the object(s), person(s), animal(s), and/or place(s) included in the surroundings of camera 106 (see FIG. 1), (vii) a direction in which camera 106 (see FIG. 1) is pointed, (viii) speech of the user and other person(s) near the user, (ix) recent activities of the user and/or places recently visited by the user, and (x) event(s) scheduled or expected to occur in the surroundings of camera 106 (see FIG. 1) at a current time at which camera 106 (see FIG. 1) is being used or within a predetermined duration of time starting at the current time. Camera usage management system 104 (see FIG. 1) may determine the aforementioned event(s) scheduled or expected to occur by receiving historical data about other events which are the same as or similar to the aforementioned event(s). Camera usage management system 104 (see FIG. 1) may determine at least a portion of the context of camera 106 (see FIG. 1) by receiving and analyzing data from sensors 108-1, . . . , 108-N (see FIG. 1).

After step 202 and prior to step 204, camera usage management system 104 (see FIG. 1) performs an analysis of the context determined in step 202. The analysis of the context determined in step 202 may include, but is not limited to, determining that the user of camera 106 (see FIG. 1) is attempting to capture an image by standing on a slippery slope, standing beside an animal in a zoo, hanging from a balcony of a building, standing on a section of train tracks during a time when a train is scheduled to be passing that section, or standing in a body posture that is placing a significant stress on a body part that is recovering from a recent surgery, or after activities that indicate that the user's judgment may be impaired.

In step 204, based on the analysis of the context of camera 106 (see FIG. 1), camera usage management system 104 (see FIG. 1) determines that the usage of the camera by the user is likely to cause a danger to the user, other person(s), and/or object(s) (e.g., property).

In step 206, based on the usage of camera 106 (see FIG. 1) being likely to cause the danger to the user, another person, and/or an object, camera usage management system 104 (see FIG. 1) sends a notification (i.e., a warning) about the danger to the user and/or to one or more other persons (e.g., a person who is a subject of the image being captured or a parent of the user).

In step 208, based on the usage of camera 106 (see FIG. 1) being likely to cause the aforementioned danger, camera usage management system 104 (see FIG. 1) disables the functionality of camera 106 (see FIG. 1), so that camera 106 (see FIG. 1) is not able to capture an image.

Prior to step 210, remote server computer 110 (see FIG. 1) receives and analyzes information from websites 112 (see FIG. 1), where the information is from social media websites, news websites, crowdsourcing, etc. By analyzing the received information 112 (see FIG. 1), remote server computer 110 (see FIG. 1) identifies locations of concern 114 (see FIG. 1) and patterns of concern 116 (see FIG. 1) that specify risky geographic locations for photography and risky geographic locations associated with events that are likely to occur at or near the current time at which camera 106 (see FIG. 1) is being used.

In step 210, based on the usage of camera 106 (see FIG. 1) being likely to cause the aforementioned danger and in response to the user activating a focusing feature of camera 106 (see FIG. 1), camera usage management system 104 (see FIG. 1) highlights location(s) or boundaries of location(s) in a display in camera 106 (see FIG. 1), where the display is viewed by the user, and where the highlighted location(s) or boundaries of the location(s) specify the locations of concern 114 (see FIG. 1) and/or the patterns of concern 116 (see FIG. 1).

The process of FIG. 2A ends at step 212.

In other embodiments, the process of FIG. 2A is modified to omit one or two of the steps 206, 208, and 210.

FIG. 2B is a flowchart of a process of managing a usage of a camera by using a parental control rule, in accordance with embodiments of the present invention. In the discussion of FIG. 2B presented below, alternate embodiments can replace "parent" with "guardian" or another person who is supervising the user of camera 106 (see FIG. 1).

The process of FIG. 2B starts at step 250. In step 252, camera usage management system 104 (see FIG. 1) receives a parental control rule that specifies control of the usage of camera 106 (see FIG. 1) by a child or children of a parent. In one embodiment, the parent selects one or more locations of concern and/or one or more patterns of concern from a predetermined list of concerns, where the parental control rule received in step 252 uses the selected location(s) of concern and/or pattern(s) of concern to specify situations in which the user or another person is in danger of being harmed as a result of the usage of camera 106 (see FIG. 1) and which require notifying the parent about the danger, notifying the user about the danger, and/or disabling functionality of camera 106 (see FIG. 1).

In step 254, camera usage management system 104 (see FIG. 1) determines an identity of the user of camera 106 (see FIG. 1). For example, camera usage management system 104 (see FIG. 1) uses biometric or facial recognition information from sensor 108-1 (see FIG. 1) to identify the user.

In step 256, based on the identity of the user determined in step 254, camera usage management system 104 (see FIG. 1) determines whether the user is a child who is subject to the parental control rule received in step 252. If camera usage management system 104 (see FIG. 1) determines in step 256 that the user is a child who is subject to the parental control rule, then the Yes branch of step 256 is taken and step 258 is performed.

In step 258, camera usage management system 104 (see FIG. 1) determines a context of camera 106 (see FIG. 1), which is being used by the user identified in step 254. The context includes the same items described in step 202 (see FIG. 2A) and camera usage management system 104 (see FIG. 1) may determine at least a portion of the context by receiving and analyzing data from sensors 108-1, . . . , 108-N (see FIG. 1).

In step 260, camera usage management system 104 (see FIG. 1) performs an analysis of the context determined in step 258 and based on the analysis of the context, camera usage management system 104 (see FIG. 1) determines a level of danger (i.e., an amount of danger) likely to be experienced by the user as a result of the usage of camera 106 (see FIG. 1).

In step 262, camera usage management system 104 (see FIG. 1) determines whether the level of danger determined in step 260 exceeds a threshold level of danger. In one embodiment, camera usage management system 104 (see FIG. 1) receives the threshold level of danger as a default value or as a parent-specified input prior to step 262. If camera usage management system 104 (see FIG. 1) determines in step 262 that the level of danger determined in step 260 exceeds the threshold level of danger, then the Yes branch of step 262 is followed and step 264 is performed.

In step 264, based on the parental control rule received in step 252 and based on the level of danger exceeding the threshold level of danger, camera usage management system 104 (see FIG. 1) sends a notification about the danger to the parent(s) of the user, notifies the user about the danger, and/or disables the functionality of camera 106 (see FIG. 1) so that the image capturing feature of camera 106 (see FIG. 1) is inoperable. After step 264, the process of FIG. 2B ends at step 266.

Returning to step 262, if camera usage management system 104 (see FIG. 1) determines that the level of danger determined in step 260 does not exceed the threshold level of danger, then the No branch of step 262 is taken and the process of FIG. 2B ends at step 266.

Returning to step 256, if camera usage management system 104 (see FIG. 1) determines that the identified user is not a child who is subject to the parental control rule received in step 252, then the No branch of step 256 is taken and step 268 is performed.

In step 268, camera usage management system 104 (see FIG. 1) performs step 204 (see FIG. 2A) and at least one step included in steps 206, 208, and 210 in FIG. 2A. After step 268, the process of FIG. 2B ends at step 266.

EXAMPLES

FIG. 3A depicts an example of a location and a position of a person at the location, which are identified by the system of FIG. 1 for managing the usage of a camera in the processes of FIG. 2A and FIG. 2B, in accordance with embodiments of the present invention. An image 300 depicts a cliff 302 and a person 304 sitting on cliff 302. With respect to the process of FIG. 2A, and prior to step 210 (see FIG. 2A), remote server computer 110 (see FIG. 1) receives image 300 from a social media website that is accessed by the user of camera 106 (see FIG. 1). Remote server computer 110 (see FIG. 1) analyzes image 300, retrieves from news websites reports of injuries sustained by people who have been on cliff 302 in positions similar to person 304, and identifies cliff 302 as being a dangerous location for photography. As a result of the analysis of image 300, remote server computer 110 (see FIG. 1) determines a new location of concern that includes cliff 302, and adds the new location of concern to locations of concern 114 (see FIG. 1). Following the analysis of image 300, the user moves to a location on cliff 302, where the movement by the user is not shown in FIG. 3A. In step 202 (see FIG. 2A), camera usage management system 104 (see FIG. 1) determines the context of camera 106 (see FIG. 1), which includes a geographic position of camera 106 (see FIG. 1). The geographic position indicates that camera 106 (see FIG. 1) is in the new location of concern that includes cliff 302. In step 204 (see FIG. 2A), camera usage management system 104 (see FIG. 1) determines that camera 106 (see FIG. 1) is located in the location of concern and in response, determines that the usage of camera 106 (see FIG. 1) is likely to cause a danger to the user because the user is close to the edge of cliff 302 is at risk of falling off of cliff 302 while using camera 106 (see FIG. 1). In step 206 (see FIG. 2A), camera usage management system 104 (see FIG. 1) sends a notification to a parent of the user and in step 208 (see FIG. 2A), camera usage management system 104 (see FIG. 1) disables the functionality of camera 106 (see FIG. 1).

Alternatively, and with respect to using a parental control rule in the process of FIG. 2B, camera usage management system 104 (see FIG. 1) determines that a parental control rule received in step 252 (see FIG. 2B) specifies a location of concern. Camera usage management system 104 (see FIG. 1) determines in step 254 (see FIG. 2B) that the user is a child and determines in step 256 (see FIG. 2B) that the user is a child who is subject to the parental control rule received in step 252 (see FIG. 2B). In step 258 (see FIG. 2B), camera usage management system 104 (see FIG. 1) analyzes image 300 captured by camera 106 (see FIG. 1) to identify cliff 302 as being the location of concern specified by the parental control rule. In step 260 (see FIG. 2B), camera usage management system 104 (see FIG. 1) determines a level of danger to person 304 and in step 262 (see FIG. 2B) determines that the level of danger exceeds the threshold level. In step 264 (see FIG. 2B), camera usage management system 104 (see FIG. 1) sends a notification to the parent about the usage of camera 106 (see FIG. 1) to capture an image that includes the location of concern and disables functionality of camera 106 (see FIG. 1).

FIG. 3B depicts an example of highlighting a location of concern identified by the system of FIG. 1 for managing the usage of a camera in the processes of FIG. 2A and FIG. 2B, in accordance with embodiments of the present invention. As described above relative to FIG. 3A, remote server computer 110 (see FIG. 1) determines a location of concern that includes cliff 302. Camera 106 (see FIG. 1) activates a focusing feature to pre-capture an image 350. Since image 350 includes cliff 302, camera usage management system 104 (see FIG. 1) determines that camera 106 (see FIG. 1) is pre-capturing an image that includes one of the locations of concern 114 (see FIG. 1). Based on the pre-capture of the image that includes the location of concern that includes cliff 302, camera usage management system 104 (see FIG. 1) in step 210 (see FIG. 2A) highlights a boundary 352 of the location of concern. The user of camera 106 (see FIG. 1) views boundary 352 in a display of camera 106 (see FIG. 1), thereby recognizing that camera 106 (see FIG. 1) will not be operable if the user takes the camera into the location of concern identified by boundary 352, or if the user attempts to capture an image of another person or an object that is in the location of concern identified by boundary 352. By recognizing that camera 106 (see FIG. 1) will not be operable under the aforementioned conditions, the user and potential subject(s) of a photograph are less likely to go into the location of concern and be exposed to the danger associated with the location of concern.

Alternatively, and with respect to using a parental control rule in the process of FIG. 2B, camera usage management system 104 (see FIG. 1) determines that a parental control rule received in step 252 (see FIG. 2B) specifies a location of concern. Camera usage management system 104 (see FIG. 1) determines in step 254 (see FIG. 2B) that the user is a child and determines in step 256 (see FIG. 2B) that the user is a child who is subject to the parental control rule received in step 252 (see FIG. 2B). In step 258 (see FIG. 2B), camera usage management system 104 (see FIG. 1) analyzes image 350 which is pre-captured by camera 106 (see FIG. 1) to identify the area between boundary 352 and the edge of cliff 302 as being the location of concern specified by the parental control rule. In step 260 (see FIG. 2B), camera usage management system 104 (see FIG. 1) determines that the camera is pointed in the direction of the location of concern. In step 260 (see FIG. 2B) and in response to camera 106 pointing in the direction of the location of concern, camera usage management system 104 (see FIG. 1) determines a level of danger to the user of camera 106 (see FIG. 1). In step 262 (see FIG. 2B), camera usage management system 104 (see FIG. 1) determines that the level of danger exceeds the threshold level. In step 264 (see FIG. 2B), based on the parental control rule and the level of danger, camera usage management system 104 (see FIG. 1) notifies the user of the danger by highlighting boundary 352 in a screen of camera 106 (see FIG. 1) that displays image 350 for viewing by the user.

FIG. 3C depicts an example of a location of concern and a camera user at the location of concern identified by the system of FIG. 1 for managing the usage of a camera by the camera user in the processes of FIG. 2A and FIG. 2B, in accordance with embodiments of the present invention. As described above relative to FIG. 3A, remote server computer 110 (see FIG. 1) determines a location of concern that includes cliff 302. Example 370 depicts a user 372 of camera 106 (see FIG. 1) attempting to take a selfie using a selfie stick 374. Camera usage management system 104 (see FIG. 1) determines the context of camera 106 (see FIG. 1) in step 202 (see FIG. 2A), which includes the geographic location of camera 106 (see FIG. 1) and the direction in which camera 106 (see FIG. 1) is pointing. Based on the geographic location of camera 106 (see FIG. 1) and the direction in which camera 106 (see FIG. 1) is pointing, camera usage management system 104 determines in step 204 (see FIG. 2A) that the user is in a dangerous location and the usage of camera 106 (see FIG. 1) is likely to cause a danger to the user. Based on the usage of the camera being likely to cause the danger to the user, camera usage management system 104 (see FIG. 1) sends a notification about the danger to the parents of the user in step 206 and disables the functionality of camera 106 (see FIG. 1) in step 208.

Alternatively, and with respect to the process of FIG. 2B, camera usage management system 104 (see FIG. 1) determines that a parental control rule received in step 252 (see FIG. 2B) specifies a location of concern. Camera usage management system 104 (see FIG. 1) determines in step 254 (see FIG. 2B) that the user is a child and determines in step 256 (see FIG. 2B) that the user is a child who is subject to the parental control rule received in step 252 (see FIG. 2B). In step 258 (see FIG. 2B), camera usage management system 104 (see FIG. 1) analyzes the geographic position of camera 106 (see FIG. 1) the direction in which camera 106 (see FIG. 1) is pointing and in response, determines that the user is likely attempting to take a selfie and the user is likely in a position relative to cliff 302 that places the user in danger because the user is at risk of falling off of cliff 302. In step 260 (see FIG. 2B), camera usage management system 104 (see FIG. 1) determines a level of danger to be experienced by the user as a result of the likely usage of camera 106 (see FIG. 1). In step 262 (see FIG. 2B), camera usage management system 104 (see FIG. 1) determines that the level of danger exceeds the threshold level. In step 264 (see FIG. 2B), based on the parental control rule and the level of danger, camera usage management system 104 (see FIG. 1) sends a notification about the level of danger to the parent and disables functionality of camera 106 (see FIG. 1).

Computer System

Figure 4:
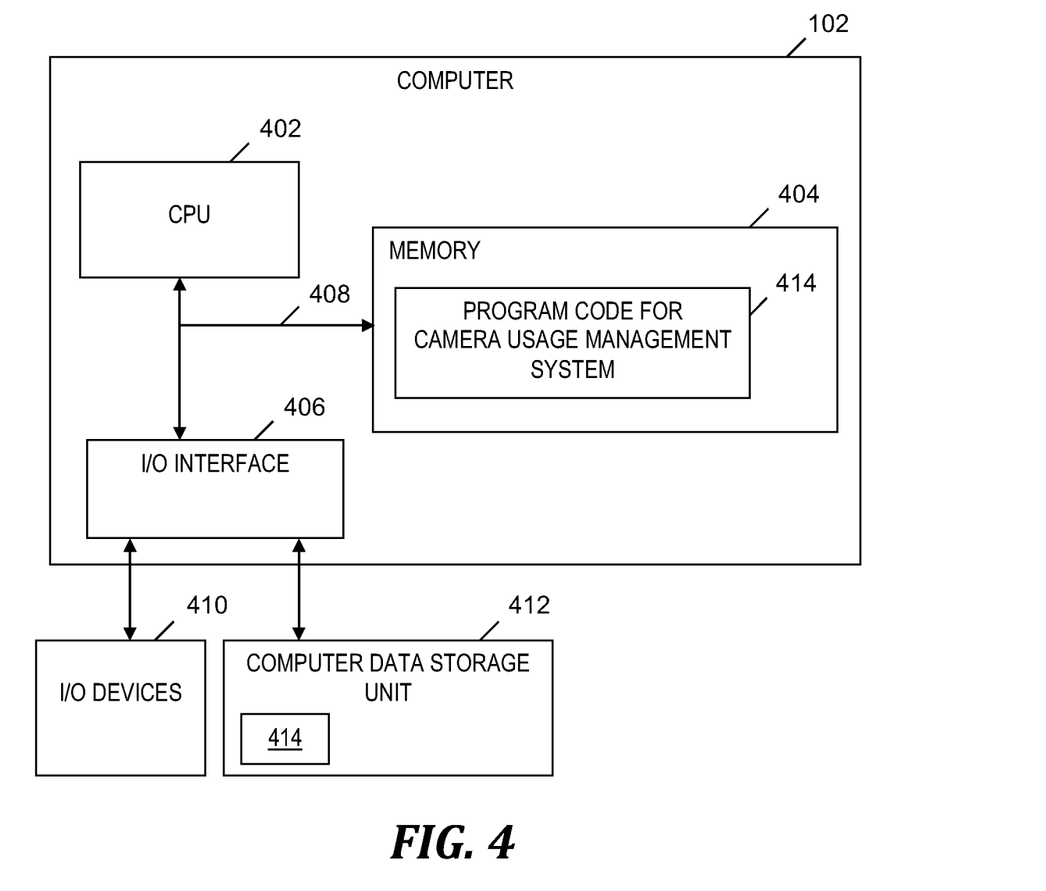
FIG. 4 is a block diagram of a computer included in the system of FIG. 1 and that implements the process of FIG. 2A and the process of FIG. 2B, in accordance with embodiments of the present invention.

FIG. 4 is a block diagram of a computer included in the system of FIG. 1 and that implements the process of FIG. 2A and the process of FIG. 2B, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for camera usage management system 104 (see FIG. 1) to perform a method of managing a usage of a camera, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to manage a usage of a camera. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 102 may store data from sensors 108-1, . . . , 108-N (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to managing a usage of a camera. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to manage a usage of a camera. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of managing a usage of a camera.

While it is understood that program code 414 for managing a usage of a camera may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of managing a usage of a camera. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium or media (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2A and FIG. 2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing a usage of a camera, the method comprising the steps of:
    a computer determining that a second geographic location of the camera matches a first geographic location associated with previous incidents of usage of cameras that caused harm to people other than users of the cameras, the second geographic location being determined in response to the camera pre-capturing a first image by an activation of a focusing feature of the camera by a user of the camera and the camera being included in the computer;
    based on the second geographic location matching the first geographic location, the computer determining that the camera is at a location of concern;
    the computer receiving a rule managed by a parent of the user, the rule specifying a control of the usage of the camera;
    in response to the step of determining that the camera is at the location of concern, the computer notifying the user of the location of concern by highlighting a boundary in the pre-captured first image on a display of the camera, the display being viewed by the user, the boundary specifying the location of concern, and the boundary being specified by the rule;
    subsequent to the step of highlighting the boundary, the camera pre-capturing a second image by another activation of the focusing feature of the camera by the user;
    in response to the step of pre-capturing the second image, the computer determining that a person in the pre-captured second image is within the boundary specified by the rule, the person being other than the user;
    based on the person in the pre-captured second image being within the boundary specified by the rule, the computer determining that the usage of the camera by the user is likely to cause a danger to the person other than the user; and
    based on the person in the pre-captured second image being within the boundary specified by the rule and based on the usage of the camera being likely to cause the danger to the person other than the user, the computer disabling a functionality of the camera so that the camera is not able to capture an image.

2. The method of claim 1, further comprising the steps of:
    the computer receiving from a remote server patterns of concern which are based on identifications by the remote server of an association among
        (i) geographic locations of events,
        (ii) respective times at which the events are scheduled to occur, and
        (iii) a likelihood that one or more persons at the geographic locations of the events at the respective times of the events are in danger, the identifications of the association being based in part on historical data; and
    the computer determining a match between
        (i) one of the patterns of concern and
        (ii) the second geographic location of the camera and a current time at which the camera is being used,
    wherein the step of determining that the usage of the camera by the user is likely to cause the danger to the person other than the user is further based on the match between
        (i) the one pattern of concern and
        (ii) the second geographic location of the camera and the current time.

3. The method of claim 1, further comprising the step of based on the person in the pre-captured second image being within the boundary, the computer sending a notification about the danger to another person who is supervising the user, the other person being an individual other than the parent of the user.

4. The method of claim 1, further comprising the step of:
    providing at least one support service for at least one of creating, integrating, hosting, maintaining, and deploying computer readable program code in the computer, the program code being executed by a processor of the computer to implement the steps of determining that the second geographic location matches the first geographic location, determining that the camera is at the location of concern, receiving the rule, notifying the user, pre-capturing the second image, determining that the person in the pre-captured second image is within the boundary, determining that the usage of the camera by the user is likely to cause the danger to the person, and disabling the functionality of the camera.

5. A computer program product, comprising:
    a computer readable storage medium; and
    a computer readable program code stored in the computer readable storage medium, the computer readable program code containing instructions that are executed by a central processing unit (CPU) of a computer system to implement a method of managing a usage of a camera, the method comprising the steps of:
    the computer system determining that a second geographic location of the camera matches a first geographic location associated with previous incidents of usage of cameras that caused harm to people other than users of the cameras, the second geographic location being determined in response to the camera pre-capturing a first image by an activation of a focusing feature of the camera by a user of the camera and the camera being included in the computer system;
    based on the second geographic location matching the first geographic location, the computer system determining that the camera is at a location of concern;
    the computer system receiving a rule managed by a parent of the user, the rule specifying a control of the usage of the camera;
    in response to the step of determining that the camera is at the location of concern, the computer system notifying the user of the location of concern by highlighting a boundary in the pre-captured first image on a display of the camera, the display being viewed by the user, the boundary specifying the location of concern, and the boundary being specified by the rule;
    subsequent to the step of highlighting the boundary, the camera pre-capturing a second image by another activation of the focusing feature of the camera by the user;

in response to the step of pre-capturing the second image, the computer system determining that a person in the pre-captured second image is within the boundary specified by the rule, the person being other than the user;

based on the person in the pre-captured second image being within the boundary specified by the rule, the computer system determining that the usage of the camera by the user is likely to cause a danger to the person other than the user; and based on the person in the pre-captured second image being within the boundary specified by the rule and based on the usage of the camera being likely to cause the danger to the person other than the user, the computer system disabling a functionality of the camera so that the camera is not able to capture an image.

6. The computer program product of claim 5, wherein the method further comprises the steps of:

the computer system receiving from a remote server patterns of concern which are based on identifications by the remote server of an association among
(i) geographic locations of events,
(ii) respective times at which the events are scheduled to occur, and
(iii) a likelihood that one or more persons at the geographic locations of the events at the respective times of the events are in danger, the identifications of the association being based in part on historical data; and the computer system determining a match between
(i) one of the patterns of concern and
(ii) the second geographic location of the camera and a current time at which the camera is being used,
wherein the step of determining that the usage of the camera by the user is likely to cause the danger to the person other than the user is further based on the match between
(i) the one pattern of concern and
(ii) the second geographic location of the camera and the current time.

7. The computer program product of claim 5, wherein the method further comprises the step of based on the person in the pre-captured second image being within the boundary, the computer system sending a notification about the danger to another person who is supervising the user, the other person being an individual other than the parent of the user.

8. A computer system comprising:
a central processing unit (CPU);
a memory coupled to the CPU; and
a computer readable storage device coupled to the CPU, the storage device containing instructions that are executed by the CPU via the memory to implement a method of managing a usage of a camera, the method comprising the steps of:

the computer system determining that a second geographic location of the camera matches a first geographic location associated with previous incidents of usage of cameras that caused harm to people other than users of the cameras, the second geographic location being determined in response to the camera pre-capturing a first image by an activation of a focusing feature of the camera by a user of the camera and the camera being included in the computer system;

based on the second geographic location matching the first geographic location, the computer system determining that the camera is at a location of concern;

the computer system receiving a rule managed by a parent of the user, the rule specifying a control of the usage of the camera;

in response to the step of determining that the camera is at the location of concern, the computer system notifying the user of the location of concern by highlighting a boundary in the pre-captured first image on a display of the camera, the display being viewed by the user, the boundary specifying the location of concern, and the boundary being specified by the rule;

subsequent to the step of highlighting the boundary, the camera pre-capturing a second image by another activation of the focusing feature of the camera by the user;

in response to the step of pre-capturing the second image, the computer system determining that a person in the pre-captured second image is within the boundary specified by the rule, the person being other than the user;

based on the person in the pre-captured second image being within the boundary specified by the rule, the computer system determining that the usage of the camera by the user is likely to cause a danger to the person other than the user; and based on the person in the pre-captured second image being within the boundary specified by the rule and based on the usage of the camera being likely to cause the danger to the person other than the user, the computer system disabling a functionality of the camera so that the camera is not able to capture an image.

9. The computer system of claim 8, wherein the method further comprises the steps of:

the computer system receiving from a remote server patterns of concern which are based on identifications by the remote server of an association among
(i) geographic locations of events,
(ii) respective times at which the events are scheduled to occur, and
(iii) a likelihood that one or more persons at the geographic locations of the events at the respective times of the events are in danger, the identifications of the association being based in part on historical data; and the computer system determining a match between
(i) one of the patterns of concern and
(ii) the second geographic location of the camera and a current time at which the camera is being used,
wherein the step of determining that the usage of the camera by the user is likely to cause the danger to the person other than the user is further based on the match between
(i) the one pattern of concern and
(ii) the second geographic location of the camera and the current time.

10. The computer system of claim 8, wherein the method further comprises the step of based on the person in the pre-captured second image being within the boundary, the computer system sending a notification about the danger to another person who is supervising the user, the other person being an individual other than the parent of the user.

* * * * *